Patented Dec. 18, 1923.

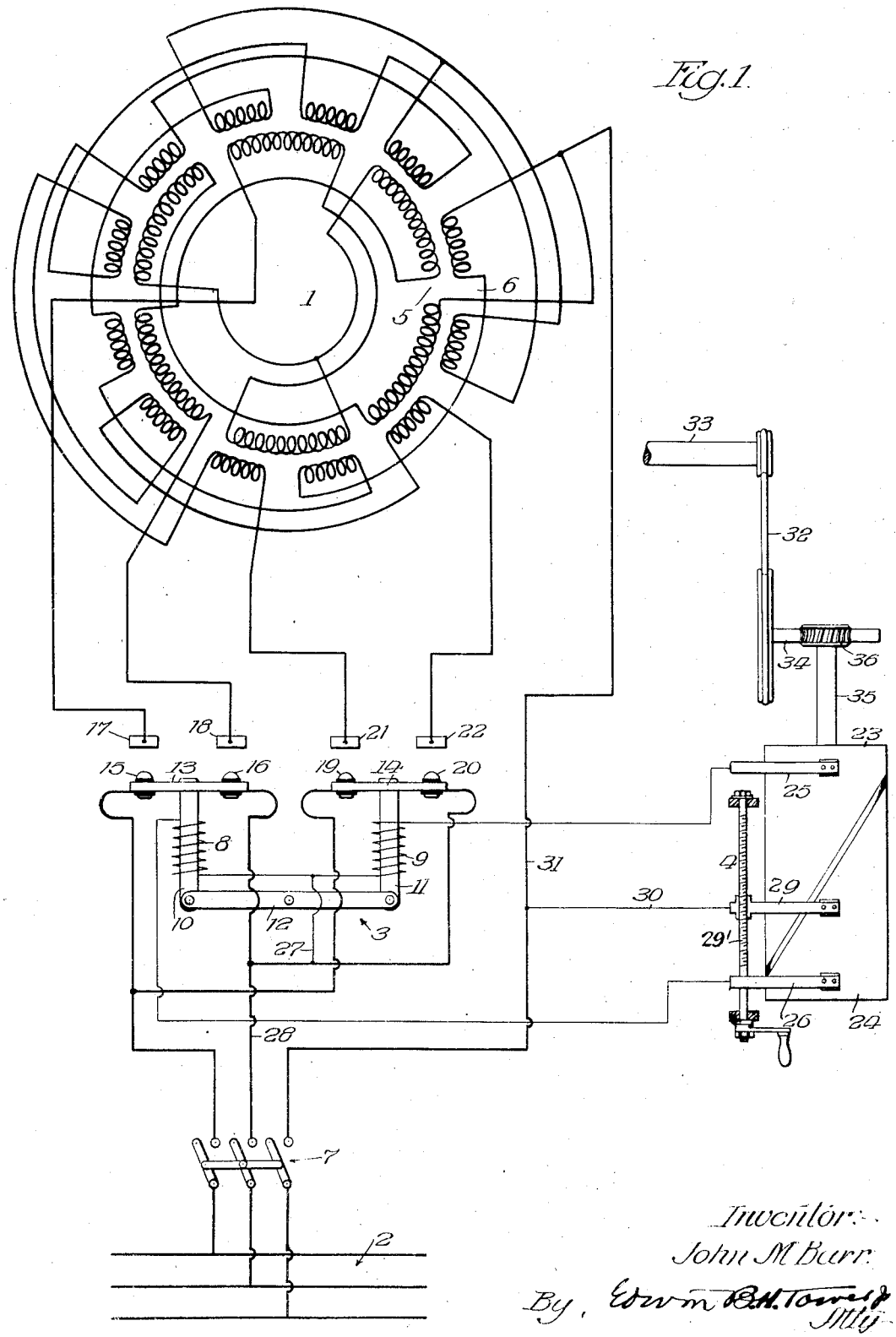

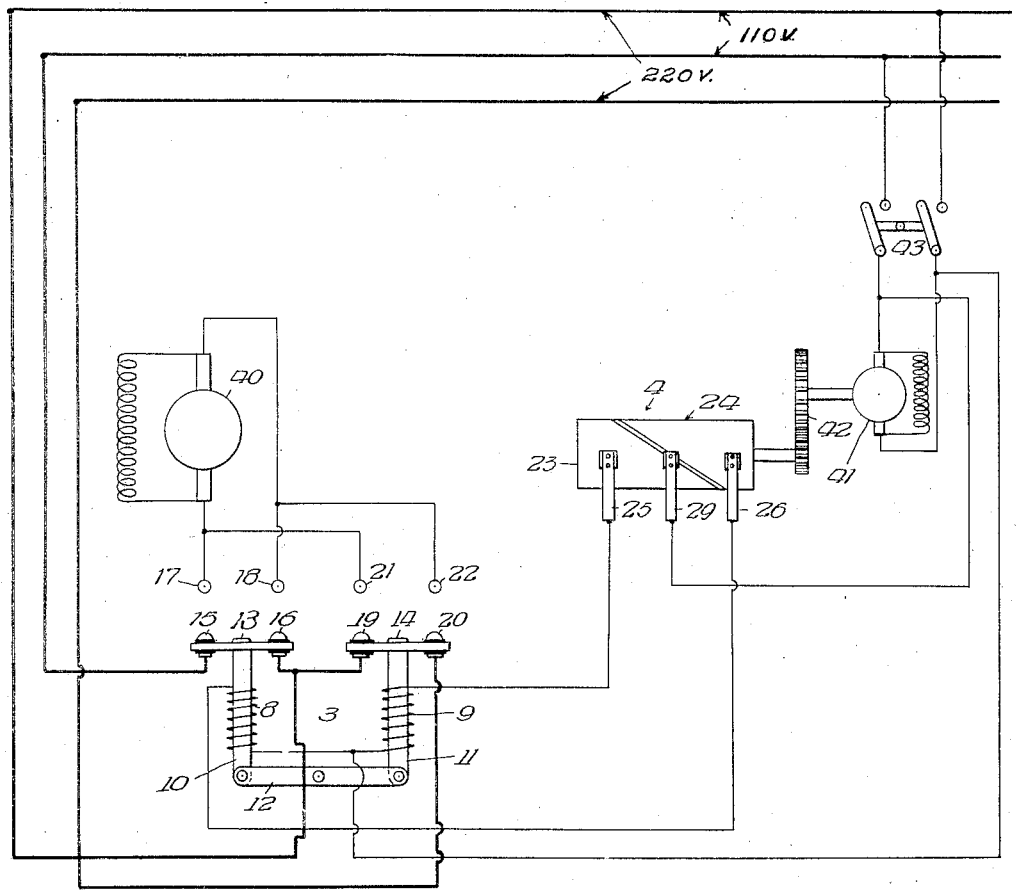

1,477,862

UNITED STATES PATENT OFFICE.

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN.

SPEED CONTROLLER.

Application filed September 5, 1922. Serial No. 586,193.

*To all whom it may concern:*

Be it known that I, JOHN M. BARR, a citizen of the United States, residing at Milwaukee, in the county of Milwaukee and State of Wisconsin, have invented new and useful Improvements in Speed Controllers, of which the following is a specification.

This invention relates to a speed controller.

While this controller is particularly adapted to operate an adjustable speed electric motor such as an induction motor in which the speed is controlled by the field windings, it may be applied to other electric motors and other prime movers.

Stokers, conveyors and similar machines are ordinarily required to deliver a predetermined amount of material within a specified time.

The amount of material to be delivered may vary under differing operating conditions.

An adjustable speed motor must therefore be employed to drive such a machine.

Such a motor provided with a controller embodying the invention is particularly adapted to drive such a machine, as it may be operated periodically at different speeds to obtain an intermediate constant average speed, and this average speed may be readily varied to meet different operating conditions.

A multi-speed alternating current induction motor operable periodically at different speeds is particularly adapted for such service, although other motors or other prime movers may be employed.

An object of the invention is to provide a controller by which a motor may be operated at different predetermined speeds to obtain an intermediate average speed.

Another object is to provide a controller by which an alternating current induction motor may be operated periodically at different speeds to obtain an intermediate constant average speed.

Another object is to provide a controller which may be adjusted to vary the intermediate average speed which is maintained.

Another object is to provide a controller by which a prime mover may be operated at different predetermined speeds to obtain an intermediate constant average speed.

Another object is to provide an efficient and durable controller which is reliable in operation.

In accordance with this invention, the controller is provided with magnetic switches and a controlling switch therefor.

As applied to a multiple speed induction motor the electro-magnetic switches of the controller control the stator by changing the number of poles and thereby change the motor speed.

As applied to a direct current motor, the electro-magnetic switches of the controller change the voltage of the current supplied and thus change the motor speed.

The controlling switch is operated automatically, and intermittently cause the electro-magnetic switches to change the poles of the induction motor or the voltage of the current supplied to the direct current motor.

This controlling switch is adjustable to vary the periods of different speeds.

The controlling switch is ordinarily operated by the motor, but may be operated from a separate source or from the machine driven by the motor.

In the drawings

Fig. 1 shows the speed controller applied to a multiple speed alternating current induction motor.

Fig. 2 shows the speed controller applied to a direct current motor.

The drawing shows a two-speed, three phase induction motor 1 operating from a three phase source 2. The speed of the motor is controlled by a controller including the electromagnetic switches 3 for changing the number of poles of the motor and a rotary switch 4 governing the operation of the electromagnetic switches to determine the length of the period the motor operates at each speed.

The induction motor 1 is provided with two sets of primary windings 5 and 6 for producing different numbers of poles thereby to cause the motor to operate at different speeds depending upon the number of poles produced.

The inner winding 5 is a two pole winding and the outer winding 6 a four pole winding.

Thus when winding 5 is connected to a source of current the motor will operate at one speed and when winding 6 is connected to the same source of current the motor will operate at a different speed.

The motor may be operatively connected to a machine such as a stoker or conveyor which is to be driven at an average speed intermediate the high and low speeds corresponding to the two speeds of the motor.

One terminal of each set of primary windings is connected through a three pole line switch 7 to one wire of the three phase supply line 2. The other two line wires are connected through the line switch to contacts of the electromagnetic switches 3.

The electromagnetic switches 3 comprise two electromagnets 8 and 9 having movable cores 10 and 11 connected by a pivoted interlocking bar 12.

The upper ends of the cores carry plates 13 and 14.

The plate 13 has mounted thereon two insulated contacts 15 and 16 adapted to engage stationary contacts 17 and 18.

The plate 14 has mounted thereon two insulated contacts 19 and 20 adapted to engage stationary contacts 21 and 22.

Movable contacts 15 and 19 are connected through one contact of line switch 7 to one conductor of line circuit 2, while movable contacts 16 and 20 are connected through another contact of line switch 7 to another conductor of line circuit 2.

Stationary contacts 17 and 18 are connected to two terminals of the motor inner primary winding 5, and stationary contacts 21 and 22 to two terminals of the primary winding 6.

When the magnet 8 operates, contacts 15 and 16 engage contacts 17 and 18 thereby connecting motor primary 5 to the source of current and causing the motor to operate at one speed.

When magnet 9 operates, its contacts will be engaged to connect motor primary winding 6 to the source of current thereby causing the motor to operate at a different speed.

The pivoted interlocking lever 12 insures that the contacts of one magnet will be disengaged while the contacts of the other are engaged.

By causing magnet 8 to operate for a portion of each minute and magnet 9 to operate during the remaining portion thereof, the motor will operate at an average speed intermediate the high and low speed corresponding to the two primary windings.

Varying the length of the period during which the respective magnets are operated changes the average speed of the motor.

Rotary switch 4 comprises a rotatably mounted drum having two insulated conducting segments 23 and 24 continuously engaged by contact brushes 25 and 26 respectively.

Brush 25 is connected to a terminal of the magnet winding 9 and brush 26 to a terminal of magnet winding 8. The other terminal of each magnet winding is connected by conductor 27 to current supply lead 28.

The rotary switch 4 is provided with a third brush 29 located between the stationary brushes 25 and 26.

Brush 29 is adjustable longitudinally with respect to the drum by an adjusting screw 29' so as to change the duration of energization of the magnets 8 and 9 of the electromagnetic switches 3.

Adjustable brush 29 is connected by conductor 30 to current supply lead 31. Thus magnets 8 and 9 are connected across one phase of the three phase source of supply.

Magnet 8 operates when adjustable brush 29 engages segment 24, while magnet 9 operates when brush 29 engages segment 23.

Movement of brush 29 nearer brush 25 increases the length of the period during which magnet 9 is operated and decreases the length of the period for magnet 8, while movement of brush 29 nearer 26 has the opposite effect.

The drum of the rotary switch 4 is continuously rotated by the motor 1 through suitable driving mechanism, such as a belt 32 connecting pulleys on the motor 33 and intermediate shaft 34, the latter being connected to the drum shaft 35 by worm gearing 36.

It will be evident therefore that the magnetic switches 3 changes the number of poles of the motor and thus the speed thereof, while rotary switch 4 controls the electromagnetic switch and determines the length of the period during which the motor is operating at the different speeds.

Figure 2 shows a shunt wound direct current motor 40 which, under control of the speed controller, is to be operated at different speeds during succeeding periods to obtain an average intermediate speed.

The motor 40 when operating at one speed is connected to a 110 volt source of current supply and when operating at another speed is connected to a 220 volt source of current supply.

The connection of the motor to the sources of current supply is controlled by electromagnetic switches 3.

Stationary contacts 17 and 21 of electromagnetic switches 3 are connected to one terminal of the motor 40 and stationary contacts 18 and 22 to the other terminal thereof.

Movable contacts 15 and 16 of magnetic switches 3 are connected to the 110 volt source of current supply and movable contacts 19 and 20 to the 200 volt source.

A terminal of magnet winding 8 is connected to brush 26 of the rotary switch 4 and a terminal of magnet winding 9 to brush 25.

The rotary switch 4 is operated by a shunt wound direct current motor 41 through suitable gearing 42.

The motor 41 is connected by a line switch 43 to the 110 volt source of current supply.

Adjustable brush 29 of the rotary switch 4 is connected to one side of the 110 volt source of current supply, the other side of which is connected to terminals of the magnet windings 8 and 9 of magnetic switches 3.

The magnets 8 and 9 are thus alternately connected across the 110 volt source of current supply by the operation of the rotary switch 4.

When the magnet 8 operates, the motor is connected to the 110 volt source of current and operates at low speed.

When the magnet 9 operates, the motor is connected to the 200 volt source of current and operates at high speed.

Thus the motor is operated at an average speed intermediate the high and low speeds.

This average speed may be varied by changing the position of brush 29 with respect to brushes 25 and 26 of the rotary switch.

The controller may, of course, be applied to operate a motor intermittently at one speed so as to obtain a substantially constant average speed adjustable between zero and the speed of the motor. In such a case the electromagnetic switch 3 would be provided with but one magnet, and the rotary switch 4 with but two brushes.

It will be understood, of course, that the speed changing switch and its controlling switch therefor may assume forms other than those illustrated herein.

The invention set forth herein, is, of course, susceptible of various other embodiments and adaptations.

The invention claimed is:

1. A speed controller for a prime mover having means for changing the speed thereof and means for automatically operating the aforesaid means periodically to change the motor speed so as to obtain a substantially constant average speed, the latter means being adjustable to vary the period during which the prime mover operates at each speed so as to enable the substantially constant average speed to be adjusted and varied.

2. A speed controller for a prime mover comprising speed controlling means and adjustable means for causing the first mentioned means to periodically change the speed of the prime mover to obtain a substantially constant average speed, which may be adjusted and varied at will.

3. A speed controller comprising a speed controlling switch and a continuously rotating switch for causing the speed controlling switch to be actuated periodically, such rotary switch having means for adjusting the time the speed controlling switch is open and closed.

4. A speed controller comprising a speed controlling magnetic switch and a rotary switch operating automatically to cause the magnetic switch to be operated periodically, such rotary switch having means for adjusting the time the magnetic switch is open and closed.

5. A speed controller comprising a magnetic switch for causing a prime mover to operate at different speeds, and a switch operating automatically to periodically operate the magnetic switch to change the speed of the prime mover so as to obtain a substantially constant average speed.

6. A speed controller for an induction motor having windings for producing different numbers of poles comprising electromagnetic switch means for controlling the number of poles produced by the windings, and means operating automatically to periodically operate the electromagnetic switch means.

7. A speed controller for an induction motor having windings for producing different pole numbers, comprising magnetic switch means for determining the number of poles produced by the windings, and an adjustable rotary switch governing the operation of the magnetic switch means.

8. A speed controller for an induction motor having windings for producing different numbers of poles, comprising electromagnetic switch means for determining the number of poles produced, an energizing circuit therefor, and a rotary switch operating automatically to render the energizing circuit effective.

9. A speed controller for an induction motor having windings for producing two different numbers of poles comprising a two position switch for controlling the motor windings so that one number of poles is produced while the switch is in one position and a different number of poles is produced when the switch is in the other position, and means operating automatically for causing the switch to move from one position to the other.

10. A speed controller for an induction motor comprising means for changing the speed of the motor, and means for operating the speed changing means to periodically change the speed of the motor to obtain a substantially constant average speed.

11. A speed controller for an induction motor comprising magnetic switch means for changing the speed of the motor, and a rotary switch operating automatically to periodically actuate the magnetic switch means and thus change the speed of the motor so as to obtain a substantially constant average speed.

12. A speed controller for an induction motor comprising magnetic switch means for changing the speed of the motor, and an adjustable continuously rotating switch to periodically actuate the magnetic switch means and change the speed of the motor so as to obtain a substantially constant speed which may be adjusted and varied at will.

13. A speed controller for an electric motor comprising magnetic switch means for changing the speed of the motor, and a continuously rotating switch to periodically operate the magnetic switch means and change the speed of the motor so as to obtain a substantially constant average speed.

14. A speed controller comprising speed changing switches and a controlling switch for causing the speed changing switches to operate periodically, the controlling switch having means for adjusting the time the speed changing switches are open and closed.

15. In a speed controller for electric motors having a plurality of independent windings, switch means for alternately and periodically energizing the independent windings.

16. In a speed controller for electric motors, magnetic switch means for periodically changing the speed of a motor to obtain a substantially constant average speed.

17. In a speed controller for electric motors, magnetic switch means for changing the speed of a motor comprising a plurality of magnetic circuits and means for periodically and alternately energizing the magnetic circuits.

18. In a speed controller for electric motors, magnetic switch means for changing the speed of a motor comprising a plurality of magnetic circuits, means for periodically and alternately energizing the magnetic circuits and means for varying the period during which the circuits are energized.

19. In a speed controller for electric motors having a plurality of independent windings, switch means for alternately and periodically energizing the independent windings and means for varying the period during which the windings are energized.

20. A speed controller for prime movers comprising magnetic switch means for changing the speed of a prime mover having independent windings, a rotary switch for periodically and alternately energizing the windings and adjustable means for varying the period during which the windings are energized, increasing the period of one resulting in a decrease in the period of the other.

21. Electric switch means comprising two sets of fixed contacts, and two sets of movable contacts, each of the latter sets being provided with a magnetic core, a lever pivoted at its ends to the cores and provided with a fixed pivot intermediate its ends, a winding for each of the movable cores, whereby when one of the windings is energized its core is moved to close one set of contacts and open the other set.

22. Electric switch means comprising two sets of fixed contacts, and two sets of movable contacts, each of the latter sets being provided with a magnetic core, a lever pivoted at its ends to the cores and provided with a fixed pivot intermediate its ends, a winding for each of the movable cores, whereby when one of the windings is energized its core is moved to close one set of contacts and open the other set, and means for periodically and alternately energizing the windings.

23. An electric switch comprising a rotary drum composed of conducting material and divided into two parts insulated from each other, a fixed brush engaging with each part and an adjustable brush engaging alternately with each part whereby a plurality of circuits are periodically made and broken.

24. Electric switch means having a plurality of independent magnetic circuits, a rotary switch for periodically and alternately energizing the circuits comprising a cylindrical conductor divided diagonally into two parts insulated from each other, a fixed contact in engagement with each part and an adjustable contact alternately in engagement with each part.

In witness whereof, I have hereunto subscribed my name.

JOHN M. BARR.